United States Patent Office 2,970,435
Patented Feb. 7, 1961

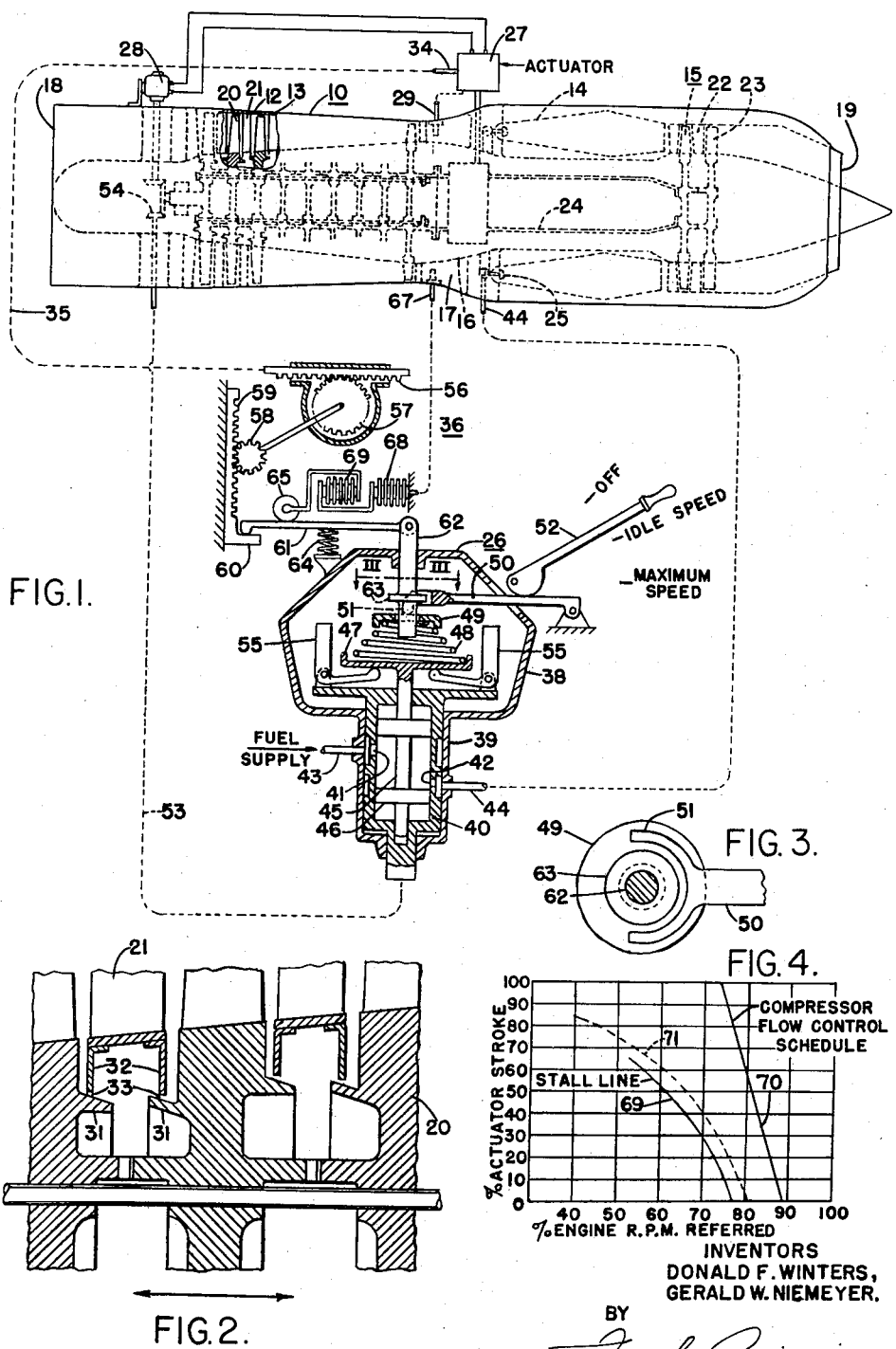

2,970,435
COMPRESSOR FLOW CONTROL MECHANISM

Donald F. Winters, Overland Park, and Gerald W. Niemeyer, Prairie Village, Kans., assignors to Westinghouse Electric Corporation, East Pittsburgh, Pa., a corporation of Pennsylvania Filed Nov. 27, 1957, Ser. No. 699,244

4 Claims. (Cl. 60—39.28)

This invention relates to controls for gas turbine engines, more particularly to controls for high performance aviation gas turbine engines having a wide rotor speed range, and has for an object to provide an improved control for automatically limiting the speed thereof to values above the stall line of the compressor.

Gas turbine engines, especially aviation turbo-jet engines, must perform properly, safely and efficiently within a wire range of rotor speeds. Usually the compressor portion of an av.ation gas turbine engine is designed for high r.p.m. At high r.p.m. values, the ratio of air outlet pressure to air inlet pressure is high, while at idling r.p.m. the ratio of air outlet pressure to air inlet pressure is considerably lower.

As generally known in the art, a compressor of the above type, although sufficiently stable at the design pressure ratio values, becomes unstable at low pressure values with resultant blade vibration and stalling leading to possible blade failure and destruction of the engine. To overcome these difficulties various solutions have heretofore been proposed for varying the compressor flow characteristics or geometry in accordance with the r.p.m. of the compressor rotor. One of the desirable compressor flow control arrangements by way of example, is that disclosed and claimed in H. F. Faught Patent 2,762,559 and assigned to the assignee of the present invention. Briefly, this patent provides an arrangement wherein the clearances in the stator blade sealing rings of an axial flow compressor are progressively increased as the compressor rotor speed decreases, thereby to relieve the stages when operated under conditions below design values. The control is effected by a rotor shifting mechanism responsive to rotor speed and compressor outlet temperatures.

However, in the event that the compressor flow control mechanism should fail to move as required, upon reduction in engine rotor speed by the operator below that corresponding to the setting of the flow control mechanism, the compressor may be seriously damaged by the effects of stalling, without sufficient warning to the operator.

In view of the above, it is a further object of the invention to prov.de a control, responsive to the position of a compressor flow control mechan sm, for automatically limiting the minimum safe speed of the compressor rotor to the value corresponding to said position, even though the throttle lever is moved to a lower speed setting.

Briefly, in accordance with the invention, there is provided a control for limiting the rotational speed of a gas turbine engine to avoid stalling of the compressor in the event that the compressor flow control mechanism (also termed compressor geometry varying mechanism) should fail to operate as requ.red.

The speed limiting control is applicable to any typical gas turbine engine comprising a gas turbine, an air compressor coupled to the gas turbine, and a fuel combustion chamber wherein fuel is burned in the presence of pressurized air provided by the compressor to provide hot motive gases for the turbine.

The engine is provided with suitable compressor flow control mechanism, which mechanism may be of the type shown in the above-mentioned H. F. Faught patent, or other mechanisms such as compressor air bleeding arrangements and variable pitch compressor blade arrangements. The actuator for positioning the flow control mechanism is provided with a feed back mechanism jointly movable therewith and having an "override" member operatively connected to a speed responsive fuel control mechanism for limiting the minimum speed of the turbine and compressor in accordance with the position of the compressor flow control mechanism. During normal operation of the flow control mechanism, the override member has no effect on the fuel control and the speed of the engine may be regulated throughout its entire speed range in the usual manner by the movable throttle lever. However, should the compressor flow control fail to move on schedule, the feed back mechanism and the override member will also fail to move, and the throttle lever is rendered ineffective to reduce the fuel control setting of the override member.

The foregoing and other objects are effected by the invention as will be apparent from the following description and claims taken in connection with the accompanying drawings, forming a part of this application, in which:

Fig. 1 is a longitudinal diagrammatic view of an aviation gas turbine engine, with portions of the compressor shown in section, and provided with control mechanism incorporating the invention;

Fig. 2 is a greatly enlarged view of the compressor port.on shown in section in Fig. 1;

Fig. 3 is an enlarged view taken on line III—III of Fig. 1 and looking in the direction of the arrows; and Fig. 4 is a chart showing representative operating characteristics attained with the control mechan.sm shown in Fig. 1.

Referring to the drawing in detail, especially Fig. 1, there is shown an aviation gas turbine power engine, generally designated 10, of somewhat convent.onal type and having the invention incorporated therewith. The engine is of the turbo-jet type and has an outer tubular casing 12 within which are disposed a compressor 13, combustion apparatus 14 and a turbine 15, in axial alignment w.th one another. Tubular core structure 16 is further provided, forming with the casing 12 an annular passageway 17 communicating with an air inlet 18 and an exhaust outlet 19. The compressor 13 is provided with a bladed rotor 20 and a bladed stator assembly 21 cooperating therewith to provide a plurality of pressure stages. The turbine 15 is also prov.ded with a bladed stator 22 and a bladed rotor 23 which is connected to the compressor rotor 20 by means of an axially-extending shaft 24.

In operation, air is drawn into the inlet 18 to the compressor 13 where it is pressurized in a series of stages by rotation of the rotor 20 and is then d rected downstream to the fuel combustion apparatus 14 where it is heated and combined with products of combustion formed by fuel admitted thereto by fuel injector nozzles 25 supplied by a fuel control mechanism 26 to provide hot motive gases for driving the turbine 15 and then ejected through the exhaust outlet 19 in the form of a propuls.ve jet.

As well understood in the art, the turbine rotor 23 drives the compressor rotor 20 by means of the connecting shaft 24, so that the r.p.m. of the compressor rotor is always the same as that of the turbine rotor. In flight, depending upon the will of the operator and other considerations, the r.p.m. of the compressor rotor 20 may vary widely from idling speed to maximum rated speed.

It is conventional practice to design the engine 10 for maximum thrust values. Accordingly, the compressor 13 is designed to operate efficiently and safely at about maximum thrust and r.p.m. values of the engine. At maximum thrust values, the ratio of air outlet pressure to air inlet pressure is high, whereas, at idling thrust the air outlet pressure to air inlet pressure ratio is relatively lower. With such a wide range of operating conditions, efficiency and stall pressure ratio of the compressor at low pressure ratio values is considerably lower than at the high pressure ratio values for which the apparatus is designed, and stalling within the stages with consequent blade damage may result.

In accordance with desirable practice, the gas turbine engine 10 is provided with suitable compressor flow control mechanism which may assume the form more fully shown and described in the previously mentioned H. F. Faught Patent 2,762,559. Briefly, the compressor flow control mechanism includes an actuator mechanism 20 for axially positioning the compressor rotor 20 in accordance with the rotary speed of the compressor rotor, sensed by the electric tachometer 28, and the air temperature of the compressor, sensed by the thermocouple 29. The compressor inter-stage seal structure comprising the rotary seal members 31 and cooperating stationary seal members 32 (see Fig. 2) are so formed that, as the rotor 20 is shifted to the left, the seal clearances 33 are progressively increased to permit greater air flow leakage therethrough, as required to avoid stalling at speeds below the compressor design point.

In accordance with the invention, the actuator 27 of the compressor flow control mechanism is provided with an axially positionable rod 34 connected by a flexible cable, indicated by dotted line 35, to a feed back mechanism 36, which, in turn, is effective to limit the minimum speed setting of the fuel control 26.

The fuel control 26 has a housing 38 having a cylindrical lower portion 39 within which is rotatably received a hollow cylindrical member 40 having an inlet port 41 and an outlet port 42. The inlet port 41 is disposed in communication with a fuel supply conduit 43, while the outlet port 42 is in communication with a fuel delivery conduit 44 connected to the fuel injection nozzles 25. Within the cylindrical member 40 there is disposed an axially movable piston valve member 45 having a lower land 46 for controlling the effective area of the port 42. The valve member 45 has an upper platform 47 carrying a helically wound speeder spring 48 and an annular cup washer 49 for centering the speeder spring on the platform. The bias of the speeder spring on the valve member is adjustable by a pivoted lever 50 (see Figs. 1 and 3) having a bifurcated end portion 51 bearing on the cup washer 49 and positionable by a manually operated throttle lever 52.

The rotatable cylindrical member 40 is driven by a flexible cable, indicated by dotted line 53, connected to the compressor rotor 20 by suitable power take-off gearing 54, and has a plurality of pivoted flyweights 55 for urging the valve member 45 upwardly against the bias of the speeder spring 48. Thus, when the speed of the engine attains the value selected by the throttle lever 52, the effective open area of the outlet port 42 assumes the value required to provide sufficient fuel to the fuel nozzles 25 to maintain the selected speed.

It is to be noted that the throttle lever 52 is movable in clockwise direction from an "off" position to the "maximum speed" position and as the throttle lever is moved in this manner, the lever 50 is progressively moved downwardly to concomitantly increase the bias of the speeder spring 48 on the valve member 45.

The feed back mechanism 36 comprises a slidably supported toothed rack 56 connected to the cable 35 and in driving engagement with a gear 57. The gear 57 is drivingly connected to a pinion 58 which engages a slidably supported toothed rack 59 having a flanged end portion 60. The flanged end portion 60 supports one end of a lever 61, pivoted at its opposite end to an override or plunger member 62 extending into the speed control housing 38 and disposed in axial alignment with the valve member 45 and the speeder spring 48. The plunger 62 has an annular enlargement or flange 63 of smaller diameter than the bight of the bifurcated lever portion 51, thereby permitting freedom of axial motion of the plunger regardless of the position of the lever portion 51. As illustrated, the plunger flange 62 is spaced upwardly from the cup washer 49, so that, in normal operation, the bias on the speeder spring is under sole control of the lever 50 and the throttle lever 52.

A compression spring 64, disposed in abutment with the lower surface of the lever 61, is effective to bias the lever 61 upwardly against a roller 65. The roller 65 acts as an adjustable fulcrum for the lever 61 and is adjustable in horizontal direction in response to temperature of the air in the compressor, sensed by a fluid filled bulb 67 and bellows 68. The bulb 67 is disposed in a manner to provide a temperature signal duplicating that of thermocouple 29. Accordingly, since in the illustrated example, the thermocouple 29 is disposed in the compressor outlet, the bulb 67 is also disposed in the compressor outlet. The amount of movement of the bellows 68 is modified by a second fluid filled bellows 69, identical to bellows 68, to render the resultant movement of roller 65 a function only of the temperature of bulb 67, independent of the temperature of the bellows 68 and 69, as well known in the art.

In operation, when it is desired to decrease the speed of the engine, the throttle lever 52 is moved upwardly to a selected position, thereby moving the lever 50 upwardly and decreasing the bias effect of the speeder spring 48 on the valve member 45 so that the valve member 45 is moved upwardly to reduce the effective area of the port 42 and decrease the fuel flow to the injector nozzles 25, thereby decreasing the speed of the engine. As the speed of the engine is decreased, the cylinder 40 is rotated at a slower rate of speed and the weights 55 are urged outwardly with reduced centrifugal force to permit movement of the valve member 45 downwardly as determined by the bias of the spring 48, thereby modifying the effective area of the port 42, as required, to stabilize the speed of the engine at the selected setting of the throttle lever 52.

During such operation, the actuator 27 acts to shift the compressor rotor 20 to the left as necessary to avoid stalling of the compressor as heretofore outlined. Concomitantly therewith, the actuator rod 34 is retracted and the cable 35 is actuated to translate the rack 56 to the left. As the rack moves to the left, the gear and pinion 57 and 58 are rotated counterclockwise, thereby translating the rack 59 downwardly. The lever 61 is thus actuated about the roller 65 to move the plunger 62 upwardly within the housing 38 so that the plunger flange 63 is maintained in spaced relation with the washer 49.

As long as the actuator 27 is operative and moves on schedule in response to a change in engine speed, the plunger 62 is positioned in such a manner that the flange 63 is upwardly spaced from the washer 49 and is ineffective to act as a stop for the speeder spring 48.

However, should the actuator 27 fail to respond to a change in rotor speed at any setting, the plunger 62 will be held in the corresponding position and the plunger flange 63 will serve as a stop to prevent excessive relaxation of the speeder spring 48 in upward direction. Hence, even though the throttle lever 52 is subsequently moved to a speed setting below that at which stalling of the compressor would occur, the speed of the engine is held above that value by the flange 63. It is to be noted, however, that the throttle lever 52 is at all times effective to increase the engine speed above that value to the maximum speed.

Referring to Fig. 4, there is shown a chart in which the abscissa represents referred engine r.p.m. in percent of maximum speed (that is, engine r.p.m. modified by compressor outlet temperature) while the ordinate represents movement of the actuator 27 in percent of total stroke. Curve 69 illustrates the actual compressor stall limit of the compressor 13 as determined by actual test, while curve 70 illustrates the operating curve attained with the compressor flow control. It will be noted by comparing the two curves, that in normal operation, the compressor flow control conditions the compressor for operation above the actual stall limit for any operating rotor speed of the engine. In addition to the above curves, there is shown a dotted line curve 71, indicating the arbitrary limit in engine speeds imposed by the feed back mechanism 36 in the event of failure of the compressor flow control.

The operating curve 70 is attained by movement of the actuator 27 in accordance with its normal operating schedule. By referring to the curve 70, it will be seen that for referred engine speeds from zero to about 74% the actuator is positioned at its maximum stroke position to apply maximum correction to the compressor 13, that is, the compressor rotor 20 is moved to the left to its extreme limit. Concomitantly therewith, the actuator rod 34 is retracted to its maximum limit, thereby positioning the plunger 62 at its upper limit and moving the plunger flange 63 upwardly to its upper limit. Should the actuator 27, and accordingly its rod 34, fail to move on schedule from the 100% actuated position, the engine speed may be increased or decreased at the will of the op rator by movement of the throttle lever 52, without fear of damage to the compressor, but at a moderate penalty in efficiency of the compressor at the higher speeds.

For referred speeds from 74% to about 88%, the actuator is linearly moved from the maximum corrective position progressively to the zero corrective position. Concomitantly therewith, the actuator rod 34 is progressively extended to actuate the feed back mechanism 36 and move the plunger flange 63 in downward direction, thereby to limit the minimum speed of the engine. Hence should the throttle lever 52 be moved to a setting lower than the safe speed of the engine, the plunger flange 63 will arrest the upward movement of the speeder spring 48 and maintain the required bias thereon to prevent a reduction in speed below the arbitrary curve 71.

For example, should the actuator 27 jam at a compressor flow control setting of 80% referred r.p.m. (curve 70) the plunger flange 63 will abut the washer 49 upon reduction in speed to about 63% (curve 71), thereby limiting the minimum speed of the engine to a value safely above the actual compressor stall point on curve 69 (about 57%) for that particular setting of the actuator 27. However, the speed of the engine may be increased at will by the operator, since movement of the throttle lever 52 to a higher speed setting depresses the lever 50 and increases the bias on the sp eder spring 48 in a downward direction away from the plunger flange 63.

As mentioned previously, the compressor flow control mechanism is required to correct the compressor operating characteristics at speeds below the design point. In the example shown, by reference to the schedule curve 70, it will be noted that the actuator 27 is at its zero movement position for referred speeds of about 88% or higher, indicating that the design point of the compressor is about 88% of maximum rated speed.

The feed back mechanism 36, as previously mentioned, is effective to position the plunger 62 as required, and the temperature sensing bulb 67 is effective to adjust the position of the roller 65 as a function of compressor air temperature.

It will now be seen that the invention provides an arrangement wherein stalling of the compressor in a gas turbine engine equipped with compressor flow control mechanism is obviated even though the flow control actuator should fail to move on schedule. The feed back mechanism 36 is effective to prevent a dangerous reduction in speed which could result in destruction of the compressor and even the entire engine, but permits the operator to regulate the speed of the engine in the usual manner at speeds safely above the stall curve 69 of the compressor.

While the invention has been shown in but one form, it will be obvious to those skilled in the art that it is not so limited, but is susceptible of various changes and modifications without departing from the spirit thereof.

What is claimed is:

1. In an aviation gas turbine engine having an air compressor, a gas turbine in driving relation with said compressor, fuel combustion apparatus for providing said gas turbine with hot motive gases, a variable fuel control mechanism for varying the rate of fuel delivery to said combustion apparatus in a manner to vary the rotational speed of said turbine and said compressor, regulating means movable in one direction to decrease the speed setting of said control mechanism and in another direction to increase the speed setting of said control mechanism, and mechanism for varying the geometry of said compressor in accordance with said rotational speed to avoid stalling of said compressor; a feed back mechanism jointly movable with said compressor geometry varying mechanism and having a member operatively connected to said fuel control mechanism, said member being movable by said feed back mechanism to limit the minimum speed of said turbine and compressor to a value above the value attainable by said regulating means in accordance with the position of said compressor geometry varying mechanism regardless of movement of said regulating means in said one direction, and said regulating means being effective to control the speed of said turbine and compressor above said minimum speed.

2. In an aviation gas turbine engine having an air compressor, a gas turbine drivingly coupled to said compressor, fuel combustion apparatus for providing said gas turbine with hot motive gases, a control mechanism responsive to rotational speed of said gas turbine for regulating the rate of fuel delivery to said combustion apparatus, means for regulating said control mechanism in a manner to vary the rotational speed of said turbine, and mechanism for varying the geometry of said compressor in accordance with said rotational speed to avoid stalling of said compressor; a feed back mechanism connected to said compressor geometry varying mechanism and jointly movable therewith, said feed back mechanism having an override member operatively connected to said fuel control mechanism and positionable by said feed back mechanism in accordance with the position of said compressor geometry varying mechanism, said override member being effective to limit the minimum speed setting of said fuel control mechanism to a value corresponding to the position of said compressor geometry varying mechanism regardless of the position of said regulating means, said override member being ineffective to control the speed setting of said fuel control above said minimum speed.

3. In an aviation gas turbine engine having an air compressor; a gas turbine drivingly coupled to said compressor; fuel combustion apparatus for providing said gas turbine with hot motive gases; a speed governor for regulating the rotational speed of said gas turbine, said speed governor having a speed responsive member driven by said gas turbine and a speeder spring for controlling the speed setting of said speed responsive member; a manually operable lever for increasing and decreasing the bias of said speeder spring, whereby to increase and decrease, respectively, the speed setting of said speed responsive member; and mechanism for varying the geometry of said compressor in accordance with said rotational speed to avoid stalling of said compressor; a feed back mechanism connected to said compressor geometry varying mechanism and jointly movable therewith, a stop member disposed adjacent said speeder spring, and means connecting said stop member to said feed back mechanism, said stop member being positionable relative to said speeder spring to control the bias thereof in decreasing direction in accordance with the position of said compressor geometry varying mechanism regardless of movement of said lever in bias decreasing direction.

4. In an aviation gas turbine engine having an air compressor, a gas turbine drivingly coupled to said compressor, fuel combustion apparatus for providing said gas turbine with hot motive gases, a control mechanism responsive to rotational speed of said gas turbine for regulating the rate of fuel delivery to said combustion apparatus, means for regulating said control mechanism in a manner to vary the rotational speed of said turbine, means providing a rotational speed signal, means providing a compressor air temperature signal, and mechanism controlled by said temperature and speed signals for varying the geometry of said compressor in a manner to avoid stalling of said compressor; a feed back mechanism connected to said compressor geometry varying mechanism and jointly movable therewith, said feed back mechanism having an override member operatively connected to said fuel control mechanism and positionable by said feed back mechanism in accordance with the position of said compressor geometry varying mechanism, said override member being effective to limit the minimum speed setting of said fuel control mechanism by said regulating means, means providing a second temperature signal duplicating said first mentioned temperature signal, and linkage structure movable in response to said second temperature signal for modifying the position of said override member.

References Cited in the file of this patent

UNITED STATES PATENTS

| | | |
|---|---|---|
| 2,474,033 | Chamberlain et al. | June 21, 1949 |
| 2,613,500 | Lysholm | Oct. 14, 1952 |
| 2,663,140 | Price | Dec. 22, 1953 |
| 2,840,344 | Stage | June 24, 1958 |
| 2,879,643 | Stroh et al. | Mar. 31, 1959 |